(12) United States Patent
Luccato (10) Patent No.: US 9,831,784 B2
(45) Date of Patent: Nov. 28, 2017

(54) ELECTRONIC RESONANT AND INSULATED HALF-BRIDGE ZETA CONVERTER

(71) Applicant: OSRAM GmbH, Munich (DE)

(72) Inventor: Daniele Luccato, Vittorio Veneto (IT)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/024,360

(22) PCT Filed: Sep. 19, 2014

(86) PCT No.: PCT/IB2014/064657
§ 371 (c)(1),
(2) Date: Mar. 24, 2016

(87) PCT Pub. No.: WO2015/044846
PCT Pub. Date: Apr. 2, 2015

(65) Prior Publication Data
US 2016/0211759 A1    Jul. 21, 2016

(30) Foreign Application Priority Data
Sep. 25, 2013 (IT) .............................. TO2013A0771

(51) Int. Cl.
*H02M 3/335* (2006.01)
*H02M 1/08* (2006.01)
(Continued)

(52) U.S. Cl.
CPC ......... *H02M 3/33546* (2013.01); *H02M 1/08* (2013.01); *H02M 1/4241* (2013.01);
(Continued)

(58) Field of Classification Search
CPC ......... H02M 3/33546; H02M 3/33507; H02M 3/335; H02M 3/33523; H02M 2001/0025;
(Continued)

(56) References Cited

U.S. PATENT DOCUMENTS

| 5,325,283 A | * | 6/1994 | Farrington | ............ | H02M 3/335 |
| | | | | | 363/132 |
| 5,684,688 A | * | 11/1997 | Rouaud | .................. | H02M 1/34 |
| | | | | | 363/132 |

(Continued)

OTHER PUBLICATIONS

Bor-Ren Lin and Fang-Yu Hsieh, IEEE vol. 54 No. 5 Oct. 2007, Soft-Switching Zeta-Flyback Converter with a Buck-Boost Type of Active Clamp.*

(Continued)

*Primary Examiner* — Gustavo Rosario Benitez
(74) *Attorney, Agent, or Firm* — Viering, Jentschura & Partner mbB (57) ABSTRACT

An electronic half-bridge ZETA converter may include a transformer, wherein a half-bridge is connected to the primary winding of transformer, and wherein a respective capacitance and a respective diode are associated with the half-bridge switches. Moreover, the converter includes a ZETA converter which is connected to secondary winding of transformer, so that the ZETA converter includes a first inductance, which includes the magnetization inductance of transformer, and a second inductance. Finally, the converter includes a control unit which drives the half-bridge switches with four time intervals that are repeated periodically. Specifically, during the fourth time interval the first and the second switch are opened, so that the capacitance associated with said second switch is charged and the capacitance associated with said first switch is discharged, enabling a zero voltage switching.

10 Claims, 9 Drawing Sheets

(51) Int. Cl.
  *H02M 1/42* (2007.01)
  *H02M 3/337* (2006.01)
  *H05B 33/08* (2006.01)
  *H02M 1/00* (2006.01)
(52) U.S. Cl.
  CPC ...... *H02M 3/3376* (2013.01); *H05B 33/0815* (2013.01); *H02M 2001/0009* (2013.01); *H02M 2001/0058* (2013.01); *Y02B 20/346* (2013.01); *Y02B 20/348* (2013.01); *Y02B 70/1433* (2013.01); *Y02B 70/1491* (2013.01)
(58) Field of Classification Search
  CPC ......... H02M 2001/0058; H02M 3/337; H02M 1/08; H02M 1/4241; H02M 3/3376; H02M 2001/0009
  See application file for complete search history.

(56) References Cited

U.S. PATENT DOCUMENTS

| | | | | |
|---|---|---|---|---|
| 5,757,626 A * | 5/1998 | Jovanovic | ........... | H02M 1/4258 363/132 |
| 5,790,389 A * | 8/1998 | Hua | .................... | H02M 1/4258 363/20 |
| 6,272,027 B1 * | 8/2001 | Fraidlin | .................. | H02M 1/34 323/222 |
| 2007/0230228 A1 * | 10/2007 | Mao | ....................... | H02M 3/156 363/89 |
| 2010/0165669 A1 * | 7/2010 | Li | ........................... | H02M 1/34 363/21.04 |
| 2010/0208499 A1 | 8/2010 | Halberstadt | | |
| 2012/0230059 A1 | 9/2012 | Adragna et al. | | |
| 2014/0092643 A1 * | 4/2014 | Luccato | ................ | H02M 3/335 363/21.12 |

OTHER PUBLICATIONS

Tsai-Fu et al.: "Design optimization for asymmetrical ZVS-PWM zeta converter"; IEEE Transactions on Aerospace and Electronic Systems; Apr. 1, 2003; pp. 521-532.

Huai Wei et al: "Comparison of basic converter topologies for power factor correction" SOUTHEASTCON '98; Apr. 24, 1998; pp. 348-353.

International Search Report based on application No. PCT/IB2014/064657 (6 pages) dated Mar. 20, 2015 (for reference purpose only).

\* cited by examiner

ELECTRONIC RESONANT AND INSULATED HALF-BRIDGE ZETA CONVERTER

RELATED APPLICATIONS

The present application is a national stage entry according to 35 U.S.C. §371 of PCT application No.: PCT/IB2014/064657 filed on Sep. 19, 2014, which claims priority from Italian application No.: TO2013A000771 filed on Sep. 25, 2013, and is incorporated herein by reference in its entirety.

TECHNICAL FIELD

Various embodiments relate to electronic converters.
Various embodiments provide the driving of a half bridge ZETA converter.

BACKGROUND

Electronic converters for light sources including, for example, at least one LED (Light Emitting Diode) or other solid-state lighting devices, may supply a direct current output. Such a current may be steady or else may vary in time, for example, in order to set the brightness of the light emitted by the light source (so-called dimming function).

Figure 1:
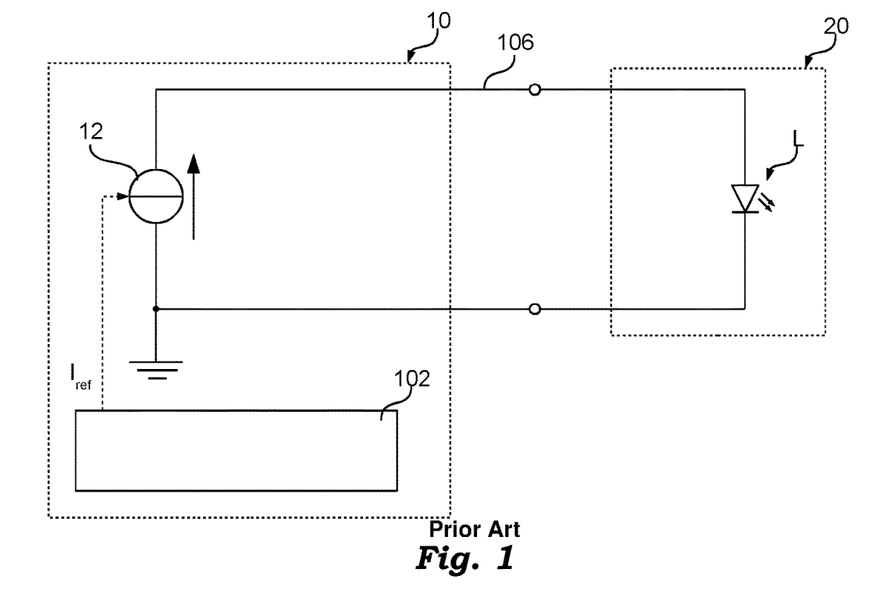

FIG. 1 shows a possible lighting system, including an electronic converter 10 and a lighting module 20 including, for example, at least one LED L.

Figure 2:
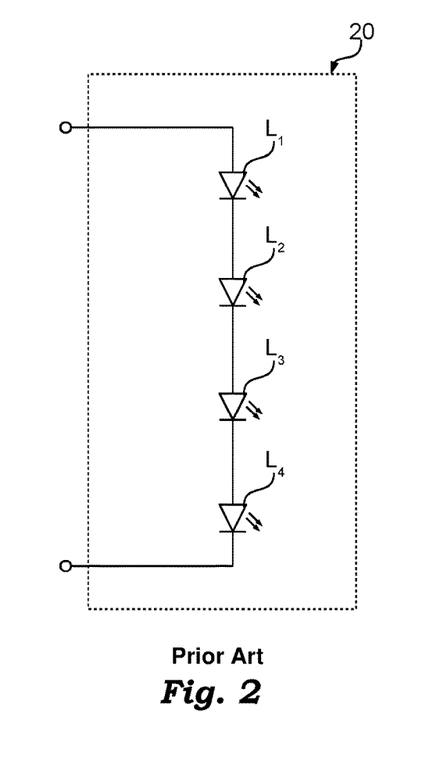

For example, FIG. 2 shows an example of a lighting module 20 including, for example, a LED chain, i.e. a plurality of LEDs connected in series. For example, in FIG. 2 four LEDs $L_1$, $L_2$, $L_3$ and $L_4$ are shown.

Electronic converter 10 usually includes a control circuit 102 and a power circuit 12 (for example a switching supply AC/DC or DC/DC), which receives as input a supply signal (for example from the mains) and supplies as output, through a power output 106, a direct current. Such current may be steady or may vary in time. For example, control circuit 102 may set, via a reference channel $I_{ref}$ of power circuit 12, the current required by LED module 20.

For example, such a reference channel $I_{ref}$ may be used to regulate the intensity of the light emitted by lighting module 20. In fact, generally, a regulation of the light intensity emitted by LED module 20 may be achieved by regulating the average current flowing through the lighting module, for example by setting a lower reference current $I_{ref}$ or by switching off power circuit 12 through a Pulse Width Modulation (PWM) signal.

However, if module 20 is supplied with a regulated voltage, i.e. if converter 12 is a voltage generator, it is typically necessary to arrange a current regulator connected in series with light sources L, in order to limit the current. In this case, the dimming function may also be implemented via such a current regulator, for example:

a) either by selectively activating or deactivating such a current regulator through a driving signal, e.g. a PWM signal, b) if an adjustable current regulator is used, by setting the reference current of such a current regulator.

Generally speaking, there are many types of electronic converters, which are divided mainly into isolated and non-isolated converters. For example, non-isolated converters are "buck", "boost", "buck-boost", "Cuk", "SEPIC" and "ZETA" converters, while isolated converters are "flyback", "forward", "Half-bridge" and "Full-bridge" converters. Such converter types are well known to the skilled in the art.

Figure 3:
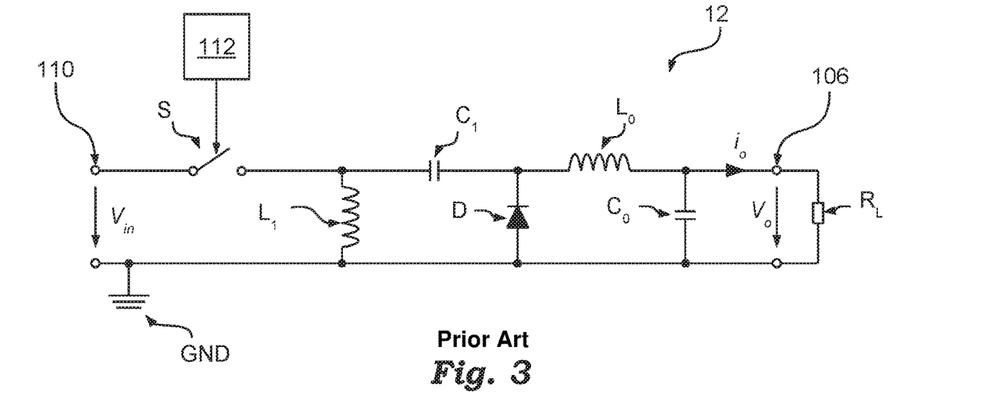

For example, FIG. 3 shows a circuit diagram of a ZETA converter which operates as a DC/DC converter. The person skilled in the art will appreciate that an input AC current may be converted into a direct current via a rectifier, for example a diode-bridge rectifier, and possibly a filtering capacitor.

Substantially, a ZETA converter includes an electronic switch S, a diode D, two inductors $L_0$ and $L_1$ and two capacitors $C_0$ and $C_1$, and therefore represents a fourth-grade converter.

In the presently considered example, converter 12 receives as input, via two input terminals 110, a voltage $V_{in}$ and supplies as output, via two output terminals 106, a regulated voltage $V_o$ or a regulated current $i_o$.

Specifically, the first terminal of input 110 is connected through switch S to a first terminal of inductor $L_1$ and the second terminal of input 110 is connected directly to the second terminal of inductor $L_1$ and represents ground GND.

In the considered example, the first terminal of inductor $L_1$ is connected through capacitor $C_1$ to the cathode of diode D, and the second terminal of inductor $L_1$ is connected directly to the anode of diode D. The anode of diode D, i.e. the second terminal of inductor $L_1$, is also directly connected to output 106, specifically to the second terminal of output 106.

The cathode of diode D is connected via the second inductor $L_0$ to the first terminal of output 106. Finally, capacitor $C_0$ is connected in parallel with output 106, i.e. directly to the terminals of output 106.

In the considered example, a load $R_L$ is connected to such an output 106, which for example may be the previously described lighting module 20.

As previously mentioned, the control may take place in current or in voltage. To this purpose a control unit 112 is typically used which drives switch S so that the output voltage $V_o$ or the output current $i_o$ is set to a desired value, such as for example the reference current $I_{ref}$. To this purpose it is possible to use, in a manner known per se, a sensor adapted to detect current $i_o$ or voltage $V_o$.

Figure 4A:
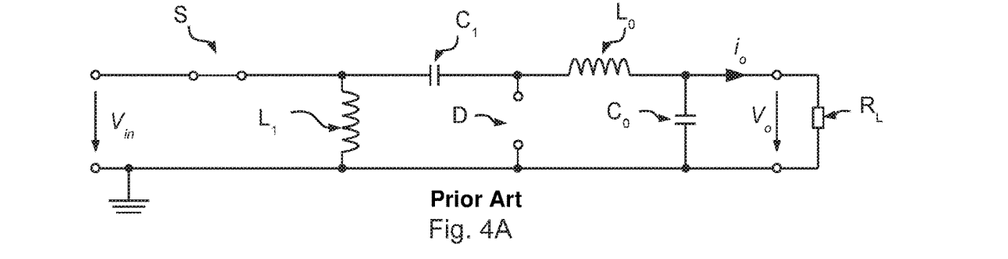
Figure 4B:
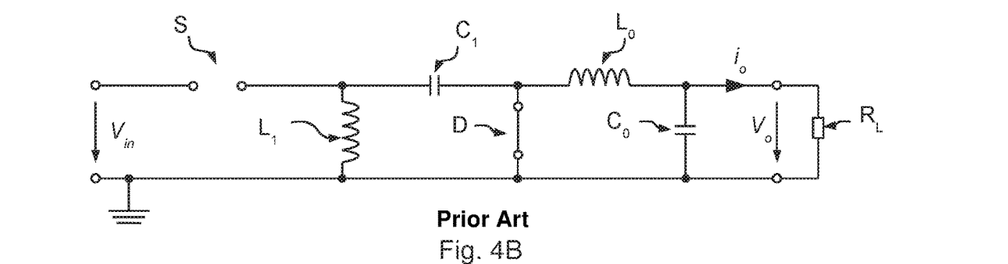

Referring to FIGS. 4A and 4B, a possible driving of such a ZETA converter will be described.

Specifically, as shown in FIG. 4A, during a first operation interval switch S is closed and diode D is OFF, i.e. diode D is inversely biased. In this case, inductor $L_1$ saves the energy received from the input and capacitor $C_1$ supplies energy, through output switch $L_0$ and capacitor $C_0$, to load $R_L$. In this condition, the currents flowing through inductances $L_1$ and $L_0$ increase in a substantially linear way, while no current flows through diode D.

On the contrary, as shown in FIG. 4B, during a second operating interval switch S is open and diode D is ON. In fact, diode D is directly biased, because the bias of the voltage across inductance $L_1$ is inverted. In this condition, the currents flowing through inductors $L_1$ and $L_0$ decrease in a substantially linear way. Specifically, the energy saved in inductance $L_1$ is mainly transferred to capacitor $C_1$ and the load receives energy mainly from inductor $L_0$. Therefore, the current flowing through diode D is:

$$i_D = i_{C1} + i_{Lo} \qquad (1)$$

Details about the operation of such a ZETA converter are described for example in the paper by Huai W E I, et al., "*Comparison of basic converter topologies for power factor correction*", IEEE Proceedings Southeastcon '98, p. 348-353, 24-26th Apr. 1998, Orlando, Fla., the content whereof is incorporated herein as a reference.

Figure 5:
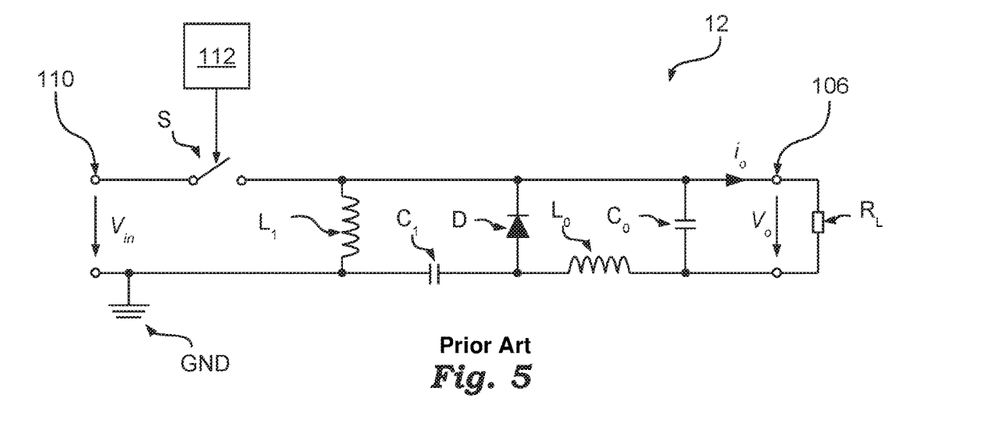

FIG. 5 shows an alternative embodiment of a ZETA converter, wherein the arrangement of capacitor $C_1$ and of inductor $L_0$ is different.

In the presently considered embodiment, the first terminal of inductor $L_1$ is connected directly to output 106, specifically to the first terminal of output 106. On the contrary, the second terminal of inductor $L_1$ is connected, through capacitor $C_1$, to the anode of diode D, wherein the cathode of diode D is connected directly to the first terminal of output 106, i.e. to the first terminal of inductor $L_1$.

In the considered embodiment, the anode of diode D is connected through inductor $L_0$ to the second terminal of output 106.

Finally, in this case, too, capacitor $C_0$ is connected in parallel to output 106, i.e. directly to the terminals of output 106.

Therefore, in the presently considered embodiment, the positions of capacitor $C_1$ and of inductor $L_1$ have changed: in FIG. 3 they were connected in series between the first terminal of inductor $L_1$ and the first output terminal, while capacitor $C_1$ and inductor $L_0$ are connected in series between the second terminal of inductor $L_1$ and the second output terminal in FIG. 5.

However, the general operating principle is substantially unaltered.

Typically, both operating intervals are repeated periodically with a fixed frequency, wherein the energy transfer is controlled via a PWM signal, i.e. the duration of the first and of the second interval are variable, while the sum of the durations is constant.

The skilled in the art will appreciate that such a PWM driving and the control of the durations of the operating intervals are well known and can be implemented, for example, through a feedback of the output voltage or current through an error amplifier. For example, in the case of a control by current, the duration of the first interval is increased until the (average) output current reaches a predetermined threshold.

In the known state of the art it has been moreover proposed to drive such a ZETA converter with a sort of driving called "soft switching", wherein switch S is switched when the voltage across switch S is zero (zero voltage switching, ZVS). As a matter of fact, this sort of driving may reduce the switching losses and the electromagnetic interference (EMI).

For example, the paper by TSAI-FU, et al., "*Design optimization for asymmetrical ZVS-PWM zeta converter*", IEEE Transactions on Aerospace and Electronic Systems, Vol. 39, Iss. 2, p. 521-532, April 2003, the content of which is incorporated herein as a reference, describes the use of an active clamp to such a purpose.

Specifically, as shown in FIG. 2 of said paper, a ZETA converter may be transformed into an isolated ZETA converter by replacing inductor $L_1$ with a transformer T including a primary winding T1 and a secondary winding T2. Specifically, transformer T may be modelled as an ideal transformer with a given turn ratio 1:n, an inductance Lm connected in parallel with primary winding T1, representing the magnetization inductance of transformer T, and an inductance Lr connected in series with primary winding T1, modelling the leakage inductance. Moreover, switch S may also be arranged between the primary winding of the transformer and ground, which enables the use of an N-MOS transistor. Subsequently, an "active clamp" including an electronic switch (S2 in the paper) and a capacitor (capacitor Cc) is added to said isolated ZETA converter. According to the teaching of the above-mentioned paper, switches S1 and S2 are then driven with 4 driving modes, which are shown in FIGS. 3 and 4A-4B of said paper.

Essentially, the paper by WU TSAI-FU describes that such a converter is adapted to switch the switches S1 and S2 at zero voltage and the diode at zero current. Specifically, in section "*F. Selection of Resonant Inductor and Clamping Capacitor*" there is stated that the zero voltage switching may be obtained if leakage inductor Lr of the transformer has a stored energy which is sufficient to discharge the capacitance of switches and other capacitances (see equation (35) of the paper).

On the basis of such considerations, the paper indicates two relations (equations (37) and (39) of the paper) which enable to determine the minimum value for the leakage inductance of the transformer, as a function of the current flowing through switches S1 and S2, the input voltage, the duty cycle and the value of capacitance Cr.

Moreover, the paper proposes to dimension the clamping capacitor (Cc in the paper) as a function (see equation (41) of the paper) of the leakage inductance, of the duty cycle and of the switching frequency, so that a half-period of the resonance frequency of the leakage inductance Lr and of the clamping capacitor is higher than the maximum time during which switch S1 is open.

For example, in the article a leakage inductance is used which equals 20 µH and a clamping capacitor with 0.22 µF.

However, the inventor has observed that this kind of dimensioning of components has a number of drawbacks. In fact, the dimensioning of capacitor Cc causes the resonance current of leakage inductance Lr and of clamping capacitor Cc to be different from zero when switch S1 is opened or when switch S2 is closed. Therefore, in this case, the diode of the ZETA converter does not switch at zero current, which is visible for example in FIG. 14 of the paper. Moreover, as described at "*C. Selection of power switches and diode*", switches must have a low capacitance, because otherwise the zero voltage switching of switches might be lost, or the leakage inductance of the transformer should be very high. Therefore, a typical value for the capacitance of switches is 42 pF.

Summary

According to various embodiments, an electronic half-bridge ZETA converter is provided. Various embodiments also concern a related method for operating an electronic half-bridge ZETA converter, and a corresponding method for designing an electronic half-bridge ZETA converter.

As previously mentioned, the present description concerns an electronic half-bridge ZETA converter supplying a power signal through an output.

In various embodiments, the electronic half-bridge ZETA converter includes a transformer with a primary winding and a secondary winding, wherein each winding includes at least a first and a second terminal. The converter includes moreover a half-bridge, i.e. a first and a second electronic switch, which is configured to selectively connect the first terminal of the primary winding to a supply signal or to ground, wherein a respective capacitance and a respective diode are associated to each switch of the half-bridge. Finally, the converter also includes, on the primary side, at least one capacitor which is connected between the second terminal of the primary winding and the supply signal and/or ground.

In various embodiments the converter includes, on the secondary side of the transformer, a ZETA converter. Specifically, in various embodiments, such a ZETA converter includes three branches which are connected in parallel, wherein:

a) the first branch includes a first capacitor, which is connected in series with the secondary winding of the transformer, and therefore the first branch includes the magnetization inductance of the transformer (and possible further inductors connected in parallel with the primary and/or the secondary winding of the transformer) and the first capacitor, b) a second branch including a diode, and c) a third branch including a second capacitor, connected in series with a second inductance, wherein the output is connected in parallel with the second capacitor.

In various embodiments, the switching of the half-bridge switches is driven by a control unit. For example, in various embodiments, the control unit drives the first and the second electronic switches with four time intervals which are repeated periodically:

a) a first time interval, wherein the first switch is closed and the second switch is open, so that a current flow from the supply signal flows through the primary winding of the transformer and such a current flow increases;

b) a subsequent second time interval, wherein the first switch is open and the second switch is open;

c) a subsequent third time interval, wherein the first switch is open and the second switch is closed; and d) a subsequent fourth time interval, wherein the first switch is open and the second switch is open.

Specifically, in various embodiments, the capacitance associated to the first switch is charged and the capacitance associated to the second switch is discharged during the second interval, and vice versa the capacitance associated to the first switch is discharged and the capacitance associated to the second switch is charged during the fourth interval, which allows a switching of the switches at zero voltage.

Specifically, while in the paper by WU TSAI-FU the leakage inductance contributed to the discharging the capacitance associated to the first switch and to the charging the capacitance associated to the second switch during the fourth time interval, according to the present disclosure such a function is now performed via the inductances of the ZETA converter, i.e. the magnetization inductance of the transformer (and possible other inductances connected in parallel with the primary and/or the secondary windings of the transformer), and the inductance of the third branch of the ZETA converter are dimensioned in such a way that such inductances supply, during the fourth time interval, a current which charges the capacitance associated with the second switch and discharges the capacitance associated to the first switch.

Thanks to such a sizing, the equivalent capacitance at the intermediate point of the half-bridge including the capacitances associated to the switches of the half-bridge may also range between 200 pF and 1.5 nF.

As a matter of fact, by knowing such an equivalent capacitance, inductances may be dimensioned as a function of the input voltage, of the duty cycle of the converter, i.e. the duration of the first time interval with respect to the duration of the switching period, of the output current supplied through the output, and the equivalent capacitance of the intermediate point of the half bridge.

In various embodiments, during the third time interval an oscillation of a resonant circuit occurs which includes the capacitor(s) connected to the second terminal of the primary winding, the capacitor connected in series with the secondary winding of the transformer and the leakage inductance of the transformer. In various embodiments, such a resonant circuit is dimensioned so that:

a) during the third time interval there are present one or various complete half periods of the resonance of such a resonant circuit, and b) the current flowing through the diode is zero at the end of the third time interval.

Therefore, thanks to such a sizing, also the diode of the ZETA converter may be switched at zero current.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIGS. 1-3, 4A-4B and 5 have already been described in the foregoing.

DETAILED DESCRIPTION

In the following description numerous specific details are given to provide a thorough understanding of embodiments. The embodiments can be practiced without one or more of the specific details, or with other methods, components, materials, etc. In other instances, well-known structures, materials or operations are not shown or described in detail to avoid obscuring aspects of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

The headings provided herein are for convenience only and do not interpret the scope or meaning of the embodiments.

Substantially, also the electronic ZETA converter of the present description is driven via a half bridge, and therefore this topology is typically called a half-bridge ZETA converter.

In this topology, the converter includes a transformer T comprising a primary winding T1 and a secondary winding T2. Specifically, transformer T may be modelled as an ideal transformer with a given turn ratio 1:n, an inductor $L_M$ which represents the magnetization inductance of transformer T and an inductor $L_R$ which represents the leakage inductance of transformer T.

The connection on the secondary side of the transformer corresponds to a typical ZETA converter, i.e. a diode, two capacitors and an inductor, because the second inductor may be represented by the magnetization inductance of the transformer.

On the contrary, on the primary side of the transformer no single switch is used, but a first terminal of the primary winding of the transformer is connected to a half bridge, i.e. at the intermediate point between two switches, and therefore such a half bridge is configured to selectively connect such first terminal of the primary winding of transformer to the input voltage or to ground. Moreover, the second terminal of the primary winding of the transformer is connected through at least a capacitor to the input voltage and/or to ground.

Figure 6:
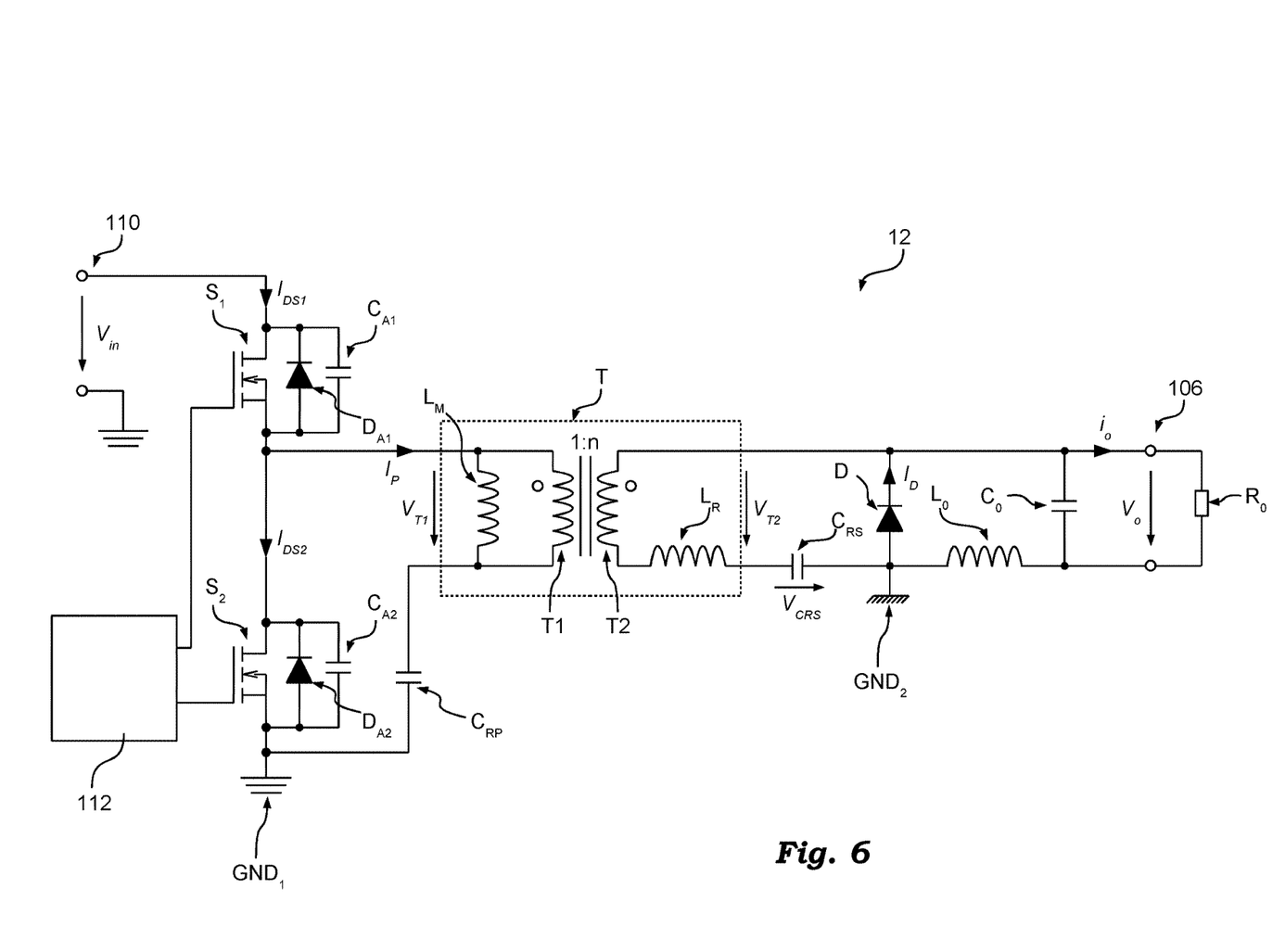
FIG. 6 shows an electronic half-bridge ZETA converter according to the present description.

For example, FIG. 6 shows a possible embodiment of an electronic half-bridge ZETA converter.

Also in this case, converter 12 receives as an input, via two input terminals 110, a supply signal, such as for instance a DC voltage $V_{in}$, and supplies as an output, via two output terminals 106, a regulated voltage $V_o$ or a regulated current $i_o$.

In the presently considered embodiment, converter 12 includes a half bridge, i.e. two electronic switches $S_1$ and $S_2$ which are connected in series between the two input terminals 110, wherein the switching of electronic switches $S_1$ and $S_2$ is driven via a control unit 112. For example, the control unit 112 may be an analogue and/or digital circuit, such as for example a micro-processor which is programmed via a software code.

For example, in the embodiment such electronic switches $S_1$ e $S_2$ are N-MOS transistors or n-channel MOSFETs (Metal-Oxide-Semiconductor Field-Effect Transistors).

In the presently considered embodiment, such switches $S_1$ and $S_2$ have respective capacitances $C_{A1}$, $C_{A2}$ and respective diodes $D_{A1}$, $D_{A2}$ connected in parallel. For example, capacitances $C_{A1}$ and $C_{A2}$ may represent the intrinsic capacitances of a MOSFET and/or may be implemented with additional capacitors, which are connected in parallel with switches $S_1$ e $S_2$.

Specifically, according to the present disclosure, the capacitance of switches $S_1$ e $S_2$ may even be remarkably higher than the value 42 pF mentioned in the paper by WU TSAI-FU. For example, the sum of capacitances $C_{A1}$ and $C_{A2}$ of switches S1 and S2 can even reach 1.5 nF. For example, in the case MOSFETs are used, the capacitances of switches $S_1$ and $S_2$ may reach 100-200 pF, but normally it is necessary to add parallel capacitances, in order to slow down the switching leading edges and to reduce EMIs, and therefore the total capacitance of the node between both switches $S_1$ e $S_2$ may reach 1.5 nF, preferably between 200 pF and 1 nF.

On the contrary, diodes $D_{A1}$ and $D_{A2}$ may represent the body diodes of a MOSFET and/or may be implemented through additional diodes.

For example, in the considered embodiment, a first terminal of primary winding T1 of transformer T is connected directly to the intermediate point between both electronic switches $S_1$ and $S_2$. On the contrary, the second terminal of primary winding T1 of transformer T is connected via a capacitor $C_{RP}$ to the second input terminal, which represents a first ground $GND_1$. Therefore, switches $S_1$ e $S_2$ may be used to selectively connect the first terminal of primary winding T1 of transformer T to voltage $V_{in}$ or to ground $GND_1$.

Generally, on the secondary side of the transformer, the ZETA converter includes three branches which are connected in parallel:
the first branch includes the secondary winding of transformer T2 (and therefore magnetization inductance $L_M$) and a capacitor $C_{RS}$;
the second branch includes diode D; and
the third branch includes inductor $L_0$ and a capacitor $C_0$, wherein load $R_L$, i.e. output 106, is connected in parallel with capacitor $C_0$.

In the presently considered embodiment, the connection on the secondary side of transformer T substantially corresponds to what is shown in FIG. 5. However, the diagram in FIG. 3 might be used as well.

Specifically, in the presently considered embodiment, the first terminal of secondary winding T2 of transformer T is connected directly to output 106, specifically to the first terminal of output 106. On the contrary, the second terminal of secondary winding T2 is connected through a capacitor $C_{RS}$ (corresponding to capacitor C1 in FIG. 5) to the anode of diode D, wherein the cathode of diode D is connected directly to the first terminal of output 106.

In the presently considered embodiment, the anode of diode D is connected via output inductor $L_0$ to the second output terminal 106, which represents a second ground $GND_2$, which due to the isolating effect of transformer T is preferably different from ground $GND_1$ and therefore is denoted with a different ground symbol.

Finally, also in this case, capacitor $C_0$ is connected in parallel to output 106, i.e. directly to the terminals of output 106.

In the presently considered embodiment, the leakage inductance $L_R$ of transformer T is shown on the secondary side of transformer T, and the magnetization inductance $L_M$ is shown on the primary side of transformer T. Generally speaking, such inductances $L_M$ and $L_R$ may also include additional inductors, such as for example an inductor connected in parallel with the primary and/or the secondary winding of transformer T, and/or an inductor connected in series with the primary and/or secondary winding of transformer T.

Therefore, from the point of view of the circuits, the circuit shown in FIG. 6 may be compared with the circuit shown in the paper by WU TSAI-FU. In fact, according to the connection of the second terminal of primary winding T1 to ground and not to voltage $V_{in}$, switch $S_1$ anyway performs the function of controlling the energy flow from supply $V_{in}$ through the primary side of transformer T. Moreover, the serial connection of capacitors $C_{RS}$ and $C_{RP}$ performs the function of the clamping capacitor Cc described in the paper by WU TSAI-FU.

However, while the zero voltage switching of half-bridge switches was obtained, in the paper by WU TSAI-FU, thanks to the dimensioning of clamping capacitance Cc and of the leakage inductance Lr, the inventor has observed that the zero voltage switching of half-bridge switches may be obtained thanks to an energy flow coming from the magnetization inductance $L_M$ and the output inductance $L_0$.

A possible embodiment of the driving of switches $S_1$ and $S_2$ of FIG. 6 will be described in the following.

In the presently considered embodiment, it is assumed that the turn ratio of primary winding T1 is the same as the turn ratio of secondary winding T2, i.e. n=1, which makes the mathematical processing simpler. However, the person skilled in the art will appreciate that the exemplary case may also be applied to the general case wherein the turn ratio differs from each other.

FIGS. 7A-7F shows in this respect the wave forms of some signals during these driving modes. Specifically, FIGS. 7A-7F respectively show:
a) the driving signal $V_{G1}$ for switch $S_1$ and the driving signal $V_{G2}$ for switch $S_2$,
b) the voltage $V_{DS2}$ across switch $S_2$,
c) the current $I_{DS2}$ which corresponds to the sum of the currents flowing through switch $S_2$, capacitance $C_{A2}$ and diode $D_{A2}$, d) the current $I_{DS1}$ corresponding to the sum of the currents flowing through switch $S_1$, capacitance $C_{A1}$ and diode $D_{A1}$, e) the current $I_D$ flowing through diode D, and f) the voltage $V_{CRS}$ across capacitance $C_{RS}$.

Figure 8A:
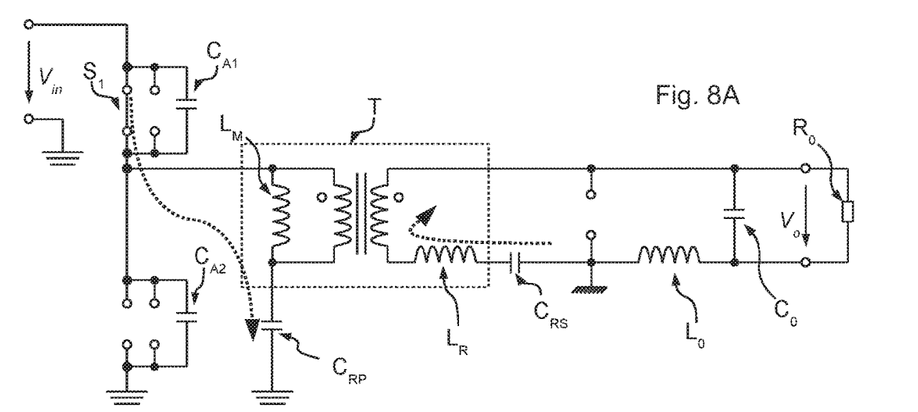

Specifically, at a time t0, switch $S_1$ is closed and switch $S_2$ remains open. Moreover, diodes $D_{A1}$, $D_{A2}$ and D are open during this operating mode (M1). The corresponding equivalent circuit of this driving mode is shown in FIG. 8A.

Specifically, as it will become clear in the following, in the presently considered embodiment switch $S_1$ is closed at zero voltage (ZVS).

Substantially, during this driving mode, a voltage corresponding to $V_{in}-V_{CRP}$, i.e. the voltage across capacitor $C_{RP}$, is applied to primary winding T1 of transformer T, i.e.

$$V_{T1}=V_{in}-V_{CRP} \quad (2)$$

Therefore, the same voltage is also applied to secondary switching T2 of transformer T, because n=1:

$$V_{T2}=V_{T1} \quad (3)$$

Figures 7, 7A, 7B, 7C, 7D, 7E, 7F:
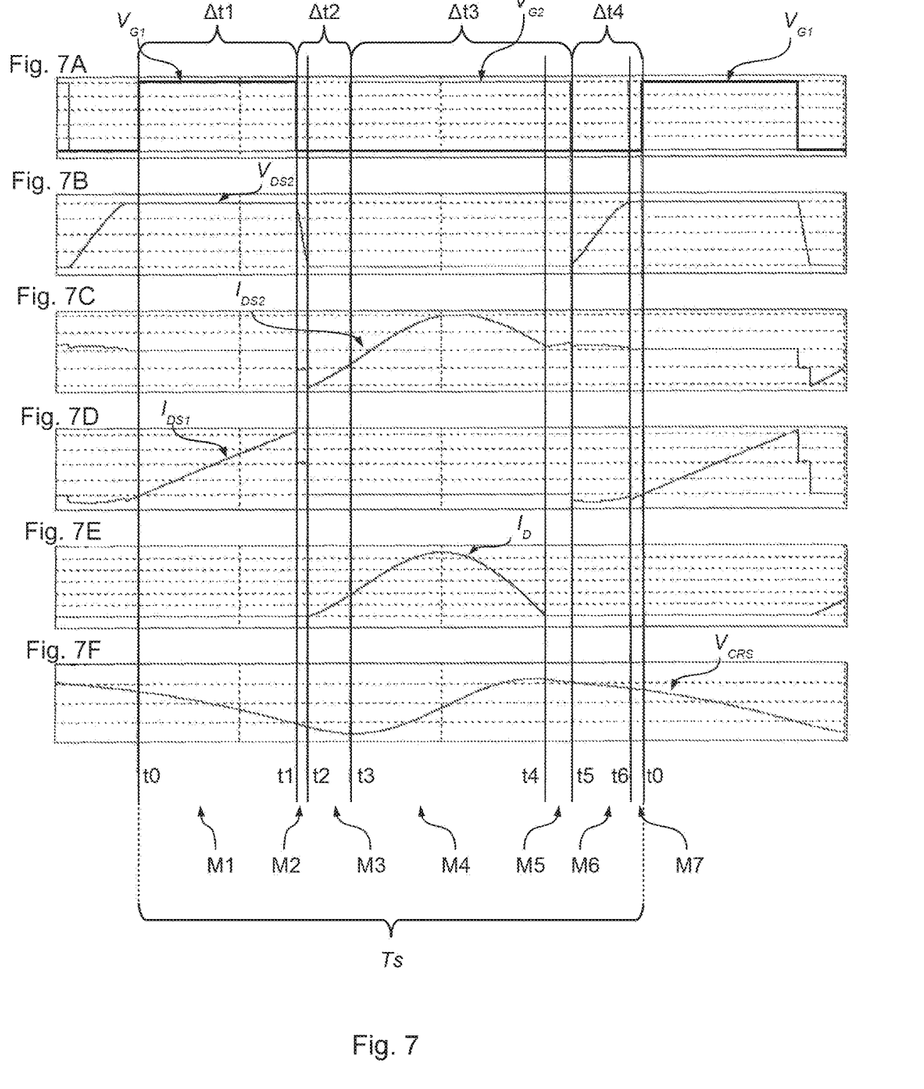
FIGS. 7A-7F, 8A-8G, 9A-E, 10, 11A-11C and 12 show details of embodiments of a driving of the converter of FIG. 6.

This voltage across secondary winding T2 and voltage $V_{CRS}$ across capacitor $C_{RS}$ are applied to inductor $L_0$ and to output 106, i.e. $C_0$ and $R_L$. Typically, inductance $L_R$ is much smaller than inductance $L_0$, i.e. $L_R \ll L_0$, and therefore the voltage across inductance $L_R$ may be neglected. Therefore, the current $I_{Lo}$ flowing through inductor $L_0$ corresponds during this mode substantially to:

$$I_{LO}(t) = I_{LO}(t0) + \frac{(V_{T2}+V_{CRS}-V_o)}{L_0}(t-t0) \quad (4)$$

i.e., during this operating mode current $I_{Lo}$ which flows through inductance $L_0$ increases in a substantially linear way, starting from the value of current $I_{Lo}(t0)$ at time t0, which is also visible in FIG. 7D, showing current $I_{DS1}$ flowing through switch $S_1$.

Figure 8B:
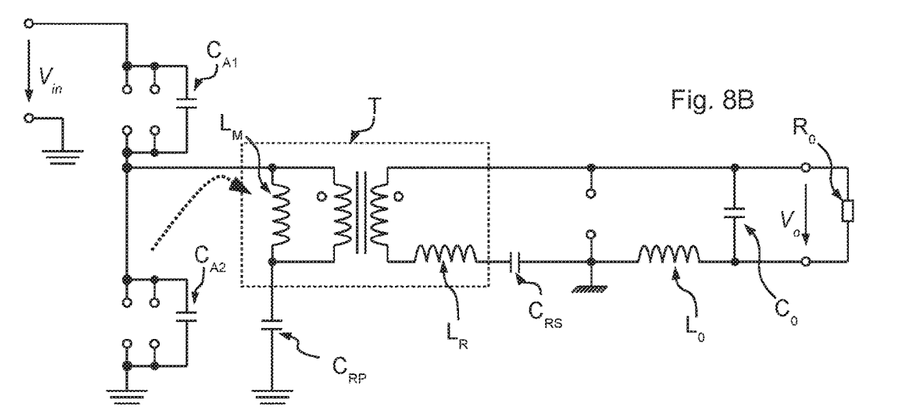

At a time t1, switch $S_1$ is opened and switch $S_2$ still remains open. Therefore, at time t1, current $I_{Lo}$ flowing through inductor $L_0$ has reached the following value:

$$I_{LO}(t1) = I_{LO}(t0) + \frac{(V_{T2}+V_{CRS}-V_o)}{L_0}(t1-t0) \quad (5)$$

Moreover, diodes $D_{A1}$, $D_{A2}$ and D are still open during this operating mode (M2). The corresponding equivalent circuit diagram of this driving mode is shown in FIG. 8B.

In the presently considered embodiment, current $I_P$ flowing through the primary side of transformer T, i.e. current $I_{LM}$ flowing through magnetization inductance and the current flowing through the ideal primary winding T1 (i.e., for example, the current across inductor $L_0$), also flows through capacitances $C_{A1}$ and $C_{A2}$:

$$I_P=I_{LM}+I_{L0} \quad (6)$$

Therefore, during this operating mode, capacitor $C_{A2}$ is discharged, and voltage $V_{DS2}$ across switch $S_2$ falls to zero thanks to that current. For example, as shown in FIG. 7B, voltage $V_{DS2}$ across switch $S_2$ (and therefore also across capacitance $C_{A2}$) decreases.

Figure 8C:
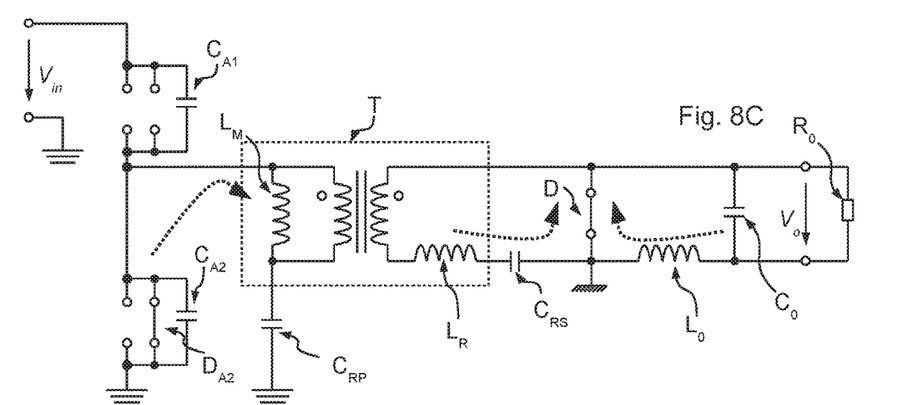

At time t2 voltage $V_{DS2}$ across switch $S_2$ reaches zero. Therefore, in this operating mode (M3), at this point current $I_P$ flowing through the primary side of transformer T only flows through diode $D_{A2}$ and the voltage $V_{DS2}$ across switch $S_2$ stays set to zero, which creates the condition for a zero voltage switching of switch S2. Moreover, during this operating mode diode D is closed and the current of the resonant circuit including inductance $L_R$ and capacitors $C_{RS}$ and $C_{RP}$ connected in series, and also the current flowing through inductor $L_0$ start flowing through diode D (see for example FIG. 7E):

$$I_D=I_{CRS}+I_{Lo} \quad (7)$$

The corresponding equivalent circuit diagram of this driving mode is shown in FIG. 8C.

Figure 8D:
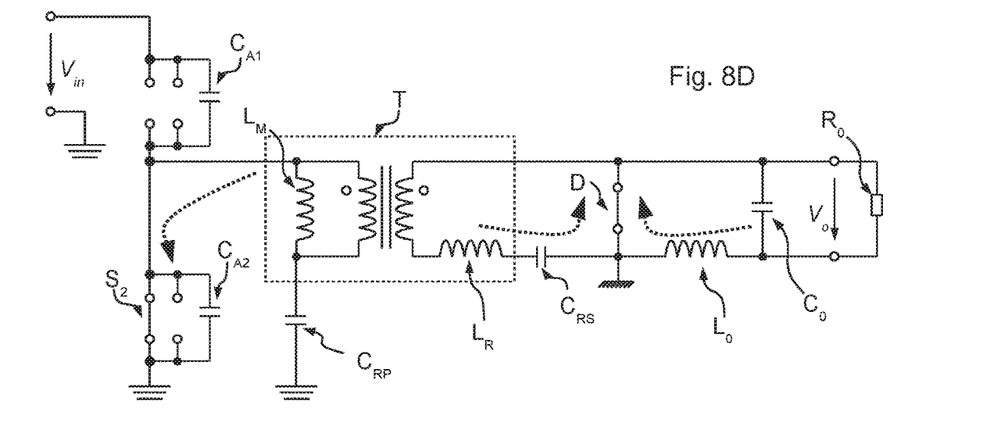

At time t3 switch $S_2$ is closed and switch $S_1$ stays open. Therefore, in this operating mode (M4) diodes $D_{A1}$, $D_{A2}$ are open and diode D stays active. The corresponding equivalent circuit diagram of this driving mode is shown in FIG. 8D.

Substantially, in this operating mode, driving signal $V_{G2}$ closes switch $S_2$ and, thanks to the fact that voltage $V_{DS2}$ has been set to zero through diode $D_{A2}$, switching is performed at zero voltage.

Moreover, the resonant frequency of the current flowing through diode D substantially corresponds to:

$$fr = \frac{1}{2\pi\sqrt{L_R C_R}} \quad (8)$$

wherein $C_R$ corresponds to capacitance $C_{RP}$ connected in series with capacitance $C_{RS}$.

Substantially, capacitor $C_{RS}$ is charged again during this mode, which is shown in FIG. 7F, and the magnetization current in the magnetization inductance $L_M$ increases.

Figure 8E:
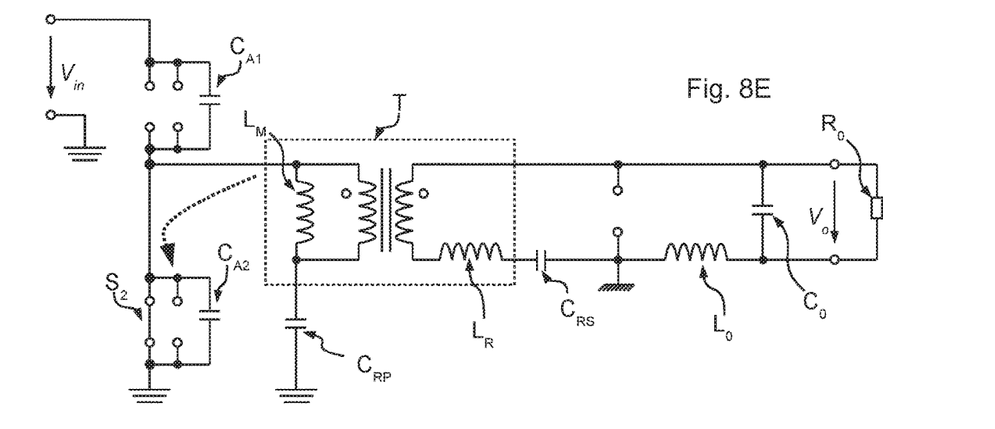

Therefore, at time t4 the current flowing through diode D reaches zero and diode D is switched off, while switch $S_2$ stays closed, switch $S_1$ stays open, and in this operating mode (M5), too, diodes $D_{A1}$, $D_{A2}$ are open. The corresponding equivalent circuit of this driving mode is shown in FIG. 8E.

Specifically, the inventor has observed that diode D opens when the current flowing through inductor $L_0$ equals the resonance current of the resonant circuit, including inductance $L_R$ and capacitors $C_{RS}$ and $C_{RP}$.

Nevertheless, there may exist situations, typically at a low duty cycle, wherein the magnetizing current on the primary may still be negative when the resonance has ended.

This is shown for example in FIGS. 9A-9E, which respectively show:

a) the driving signal $V_{G1}$ for switch $S_1$ and the driving signal $V_{G2}$ for switch $S_2$, b) the voltage $V_{DS2}$ across switch $S_2$, c) the current $I_{DS1}$ which corresponds to the sum of the currents which flow through switch $S_1$, capacitance $C_{A1}$ and diode $D_{A1}$, d) the current $I_{DS2}$ which corresponds to the sum of the currents flowing through switch $S_2$, capacitance $C_{A2}$ and diode $D_{A2}$, and e) the current $I_D$ flowing through diode D.

Figure 10:
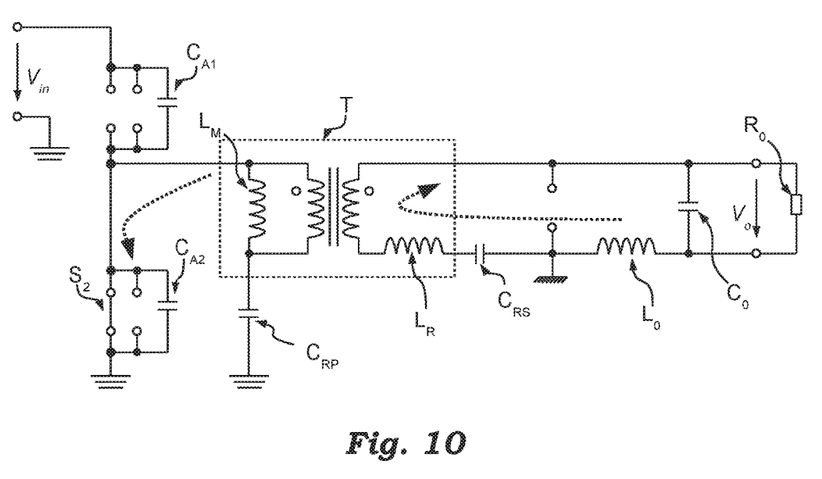

Therefore, in this situation, current $I_{L0}$ which flows through inductor $L_0$ will no longer flow through diode D, but it will start flowing through capacitor $C_{RS}$, which is shown in FIG. 10. However, such a current will also impose a current on leakage inductance $L_R$, bringing its voltage from negative to zero.

Figure 11A:
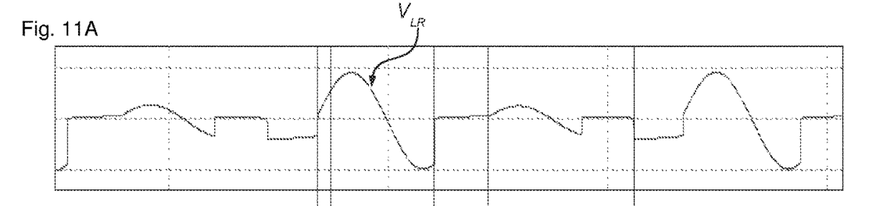
Figure 11B:
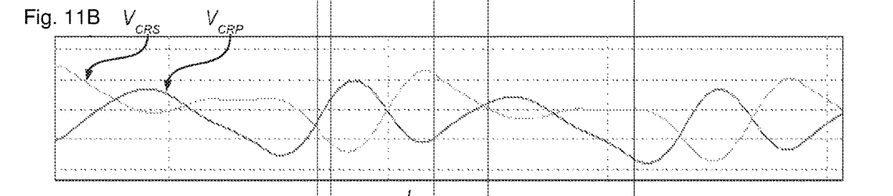
Figure 11C:
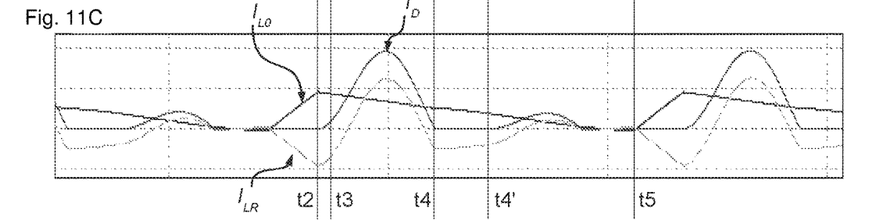

This is shown for example in FIGS. 11A-11C, which respectively show:

a) the voltage $V_{LR}$ across inductance $L_R$, a) the voltage $V_{CRS}$ across capacitor $C_{RS}$, and voltage $V_{CRP}$ across capacitor $C_{RP}$, and c) the current $I_D$ which flows through diode D, the current $I_{LO}$ which flows through inductor $L_0$, and the current $I_{LR}$ which flows across inductance $L_R$.

Specifically, at time t4 currents $I_{LO}$ and $I_{LR}$ are equal and opposed, and therefore current $I_D$ flowing through diode D is zero (see FIG. 11C) and current $I_{LO}$ takes voltage $V_{LR}$ across inductance $L_R$ to zero (see FIG. 11A), i.e.:

$$V_{T1} = V_{CRP} = V_{T2} < V_{CRS}$$

and, neglecting the voltage across leakage inductance $L_R$, voltage $V_D$ across the diode is:

$$V_D = V_{CRS} - V_{T2} < 0$$

As a consequence, the current will no longer flow through diode D, but it will charge capacitor $C_{RP}$ and discharge capacitor $C_{RS}$. However, at a time t4' the voltages across both capacitors are the same, i.e. voltage $V_{T1}$ across primary winding T1 is equal to the voltage across secondary winding T2, to the voltage across capacitor $C_{RP}$, and to the voltage across capacitor $C_{RS}$:

$$V_{T1} = V_{CRP} = V_{T2} = V_{CRS}$$

and therefore the voltage across diode D is zero:

$$V_D = 0$$

As a consequence, from time t4', current $I_{LO}$ may flow again across diode D, but now the circuit is the same as at time t3 and inductance $L_R$ with capacitors $C_{RP}$ and $C_{RS}$ may start oscillating again, and therefore a new oscillation will start; i.e., during the third time interval there may be present one or several half periods of the resonance of such an oscillation.

Figure 8F:
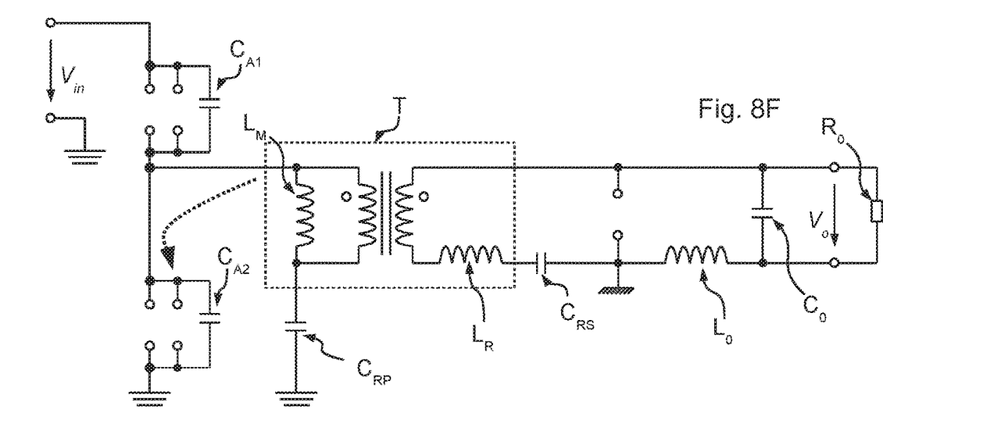

At time t5, switch $S_2$ is opened, while switch $S_1$ remains open. Moreover, diodes $D_{A1}$, $D_{A2}$ and D are open in this operating mode (M6). The corresponding equivalent circuit diagram of this driving mode is shown in FIG. 8F. In this context, the dimensioning of components and the switching period should ensure that at time t5 there is no more orcillation, as shown in FIGS. 9A-9E, 10 and 11A-11C, and current $I_P$ through the primary winding has become positive.

Therefore, during this first operating mode, current $I_P$ on the primary side of transformer T discharges capacitance $C_{A1}$ and charges capacitance $C_{A2}$ until the voltage across switch $S_2$ reaches the input voltage $V_{in}$ at a time t6, which is shown in FIGS. 7B-7D.

Figure 8G:
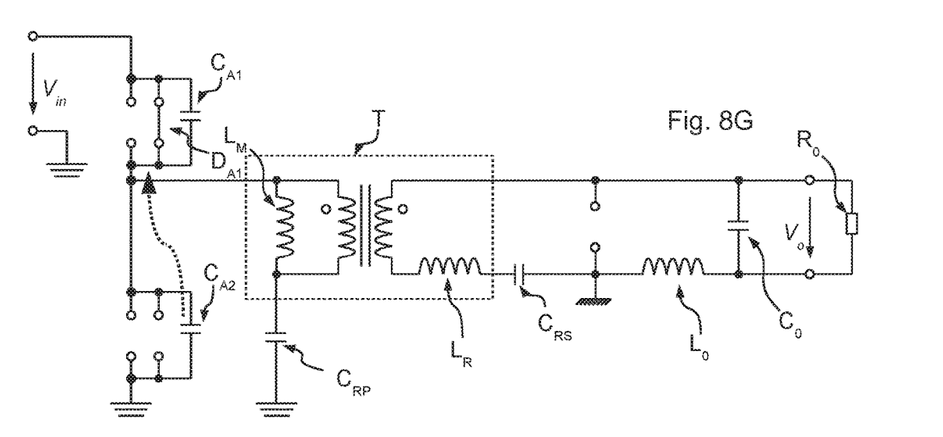
Figure 9A:
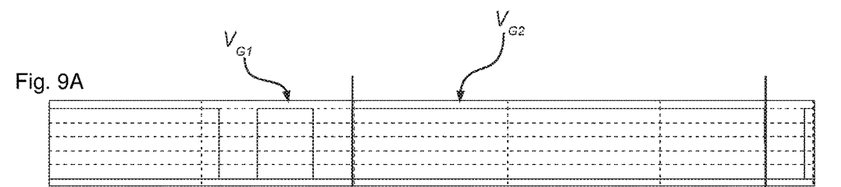
Figure 9B:
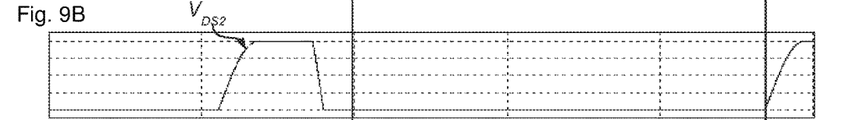
Figure 9C:
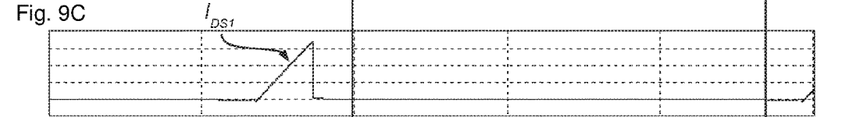
Figure 9D:
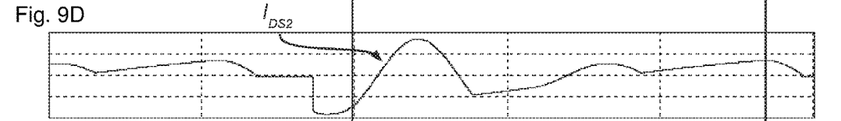
Figure 9E:
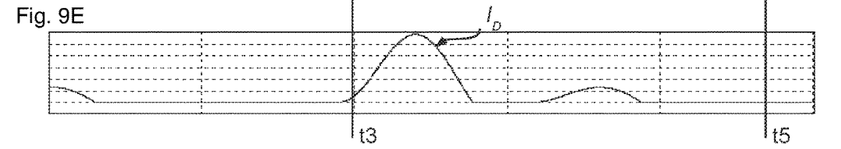

In fact, at time t6, diode $D_{A1}$ is closed and voltage $V_{DS2}$ corresponds to input voltage $V_{in}$, which generates the condition for a zero voltage switching for switch $S_1$. Diodes $D_{A2}$ and D stay open during this operation mode (M7). The corresponding equivalent circuit diagram of this operating mode is shown in FIG. 8G.

Therefore, in various embodiments, the control unit drives the half-bridge switches with the following steps, which are periodically repeated:

during a first time interval Δt1 switch $S_1$ is closed and switch $S_2$ is open (times t0-t1);

during a second time interval Δt2 switch $S_1$ is open and switch $S_2$ is open (times t1-t3); wherein, during said second time interval Δt2, capacitance $C_{A1}$ associated to switch $S_2$ is charged and capacitance $C_{A2}$ associated to switch $S_2$ is discharged, creating the condition for a zero voltage switching of switch $S_2$;

during a third time interval Δt3 switch $S_1$ is open and switch $S_2$ is closed (times t3-t5); wherein, during said third time interval Δt3, the magnetization current of the magnetization inductance increases and diode D of the ZETA converter is switched off at zero current; and during a fourth time interval Δt4 switch $S_1$ is open and switch $S_2$ is open (times t5-t0); wherein, during such a time interval Δt4, capacitance $C_{A2}$ associated to switch $S_2$ is charged and capacitance $C_{A1}$ associated to switch $S_1$ is discharged, creating the condition for a switching at zero voltage of switch $S_1$.

Therefore, the duration of the first time interval Δt1 in which switch $S_1$ is closed may be controlled so that output voltage $V_o$ reaches a desired value, as shown for example in equation (5). For example, to the purpose it is possible to use a feedback of the output voltage $V_o$ which increases or decreases such durations until the supply signal reaches a desired value.

In various embodiments, intervals Δt2 and Δt4 may be constant, and the duration of interval Δt3 may be varied to have a fixed switching frequency, i.e.

$$\Delta t3 = Ts - \Delta t1 - \Delta t2 - \Delta t4 \qquad (9)$$

wherein Ts is the duration of a switching period which is constant.

Some general considerations about the dimensioning of the various components enabling a zero voltage switching of switches $S_1$ and $S_2$ will be explained in the following.

Specifically, the inventor has observed that, thanks to the previously described driving arrangement, the switching of switch $S_1$ at time t1 and the switching of switch $S_2$ at time t3 are not very critical. However, there may occur situations wherein:

a) the switching of switch $S_1$ at time t0 does not take place at zero voltage, because voltage $V_{DS2}$ across switch $S_2$ has not reached the value of input current $V_{in}$, and/or b) the switching of switch $S_2$ at time t5 switches off diode D at non-zero current.

Figure 12:
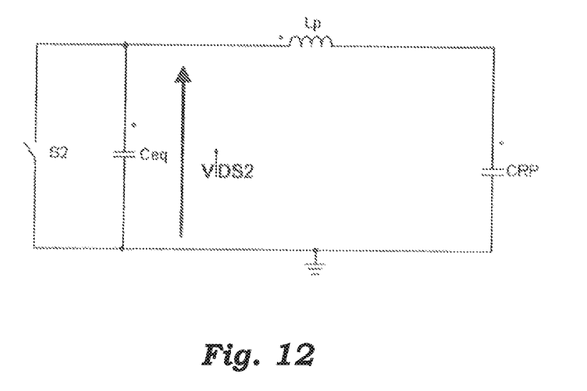

FIG. 12 shows in this respect a simplified circuit diagram for the operating mode M6.

Specifically, in the considered embodiment, a capacitor $C_{eq}$ is connected in parallel to switch $S_2$. Moreover, a circuit LC including an inductance $L_P$ and a capacitance $C_{RP}$ is connected in parallel to switch $S_2$.

In the presently considered embodiment:

a) the voltage $V_{CRP}$ across capacitor $C_{RP}$ is considered substantially constant;

b) the inductor $L_P$ represents the magnetization inductance connected in parallel with inductor $L_0$ (also in this instance neglecting leakage inductance $L_R$);

c) the capacitance $C_{eq}$ represents capacitances $C_{A1}$ e $C_{A2}$, and possible other capacitances, wherein capacitance $C_{eq}$ is typically much smaller than capacitance $C_{RP}$ ($C_{eq} \ll C_{RP}$).

As previously explained, when switch $S_2$ is opened at time t5, voltage $V_{DS2}$ increases starting from 0 V.

If current $I_P$ flowing through the primary side of transformer T equals zero at time t5, voltage $V_{DS2}$ starts oscillating with a frequency of:

$$fr = \frac{1}{2\pi \sqrt{L_P C_{eq}}} \qquad (10)$$

The maximum value that voltage $V_{DS2}$ may reach in the operating mode M6 substantially corresponds to the peak-to-peak value of the oscillation, and the minimum value $V_{DS2,min}$ corresponds to $$V_{DS2,min} = 2 \cdot V_{in} \cdot D_{min} \quad (11)$$

wherein $D_{min}$ represents the minimum duty cycle, i.e. the duty cycle for the smallest ratio between output voltage $V_o$ and input voltage $V_{in}$.

However, as such a duty cycle is typically lower than 0.5, voltage $V_{DS2}$ cannot reach voltage $V_{in}$ at time t6, which is essential to enable a zero voltage switching of switch $S_1$.

Therefore, according to the present description, the missing energy is supplied via inductor $L_P$, which must store at least the following energy:

$$\frac{1}{2} L_P I_P^2 \geq \frac{1}{2} C_{eq} [V_{in}^2 - (2 \cdot V_{in} \cdot D_{min})^2] \quad (12)$$

wherein current $I_p$ corresponds to:

$$I_p = \frac{V_{in} \cdot D_{min}[(1 - D_{min})T_s]/2}{L_P} - \left(I_o - \frac{\Delta I_{L0}}{2}\right) \quad (13)$$

For example, if the minimum duty cycle $D_{min}$ is higher than 0.5 ($D_{min} > 0.5$), current $I_p$ may also be zero, i.e.

$$\frac{V_{in} \cdot D_{min}[(1 - D_{min})T_s]/2}{L_P} - \left(I_o - \frac{\Delta I_{L0}}{2}\right) = 0 \quad (14)$$

and, as a consequence, the value of inductance $L_P$ may be calculated as:

$$L_P \leq \frac{V_{in} \cdot D_{min}[(1 - D_{min})T_s]/2}{\left(I_o - \frac{\Delta I_{L0}}{2}\right)} \quad (15)$$

On the contrary, if the minimum duty cycle $D_{min}$ is lower than 0.5 ($D_{min} < 0.5$), current $I_P$ must supply the missing energy. For example, this may be obtained by dimensioning $L_P$ in the following way:

$$L_P \leq \frac{(2BC + A) - \sqrt{(2BC + A)^2 - 4B^2 C^2}}{2C^2} \quad (16)$$

wherein:

$$-A = C_{eq} \lfloor V_{in}^2 - (2 \cdot V_{in} D_{min})^2 \rfloor$$

$$-B = V_{in} \cdot D_{min}[(1 - D_{min})T_s]/2$$

$$-C = \left(I_o - \frac{\Delta I_{L0}}{2}\right)$$

Therefore, by knowing the value of inductance $L_p$, it is possible to dimension inductances $L_M$ and $L_0$.

For example, inductance $L_0$ is typically sized according to the current ripple $\Delta I_{L0}$ which is desired at the output, as if it was a Buck converter.

Therefore, by knowing $L_p$ and $L_0$, it is possible to solve the following equation in order to calculate the value of $L_M$:

$$L_P = \frac{(L_M * n^2 * L_0)}{(L_M + n^2 * L_0)}$$

Finally, the resonance time $Tr = \pi \sqrt{L_R C_R}$ limits the maximum duty cycle. Therefore, by reducing time Tr a higher duty cycle can be obtained, and the output voltage may vary more. For this reason, with the previously described sizing, such a time should be lower than the minimum time during which switch $S_1$ is off, i.e.:

$$Tr = \pi \sqrt{L_R C_R} \leq (1 - D_{max}) T_s \quad (17)$$

wherein $D_{max}$ is the maximum duty cycle.

However, by reducing duration Tr, the current peak in diode D increases. In this context, the inventor has observed that a reasonable value for duration Tr is:

$$Tr = \frac{1}{4} T_s \quad (18)$$

wherein $T_s$ is the switching period of the converter, i.e. the duration between two subsequent times t0 in which switch $S_1$ is switched on.

Finally, in order to enable a switching of switch $S_2$ at time t5 by switching off diode D at zero current, the value of capacitance $C_R$ may be calculated as:

$$C_R \leq \frac{Tr^2}{\pi^2 L_R} \quad (19)$$

For example, if input voltage $V_{in}$ is 400 VDC, the output current is between 0 and 2 A, and the switching frequency fs is between 20 and 100 kHz, the components may have the following values:

a capacitance $C_{eq}$ up to 1.5 nF;
an inductance $L_p$ between 200 pH and 3 mH.

Therefore, with the previously described dimensioning and considering a supply of 60 W, it is possible to use MOSFETs with a capacity of about 100 pF, wherein an additional capacitor with a capacity up to 400 pF may be connected in parallel with each switch. In fact, in this case, the equivalent capacity $C_{eq}$ in the switching node may therefore be seen as a capacity of about 1000 pF.

Accordingly, by sizing the various components in a suitable way, the previously described driving method may therefore operate switches $S_1$ and $S_2$ of the half bridge at zero voltage. Such a zero voltage switching may also be obtained for a wide interval of possible duty cycles/output voltages. Moreover, also the diode of the ZETA converter is switched at zero current. As a consequence, the switches of the half bridge may have a reduced size, and also the electromagnetic interferences are reduced.

Generally, in this way, the converter may be operated with a fixed switching frequency, wherein the output inductance $L_O$ may be operated both in the CCM mode and in the DCM mode.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:
1. An electronic half-bridge ZETA converter for providing a power signal through an output, said electronic half-bridge ZETA converter comprising:
   a transformer with a primary winding and a secondary winding, wherein each winding comprises at least a first and a second terminal,
   a half-bridge comprising a first and a second electronic switch for selectively connecting said first terminal of said primary winding to a supply signal or a ground, wherein a respective capacitance and a respective diode are associated with said first and said second electronic switch,
   at least one capacitor connected between said second terminal of said primary winding and said supply signal or said ground,
   an electronic ZETA converter connected to said secondary winding, wherein said ZETA converter comprises three branches which are connected in parallel, wherein:
   a) the first branch comprises a first capacitor connected in series with the secondary winding of said transformer, so that said first branch comprises a first inductance which includes the magnetization inductance of said transformer,
   b) the second branch comprises a diode, and
   c) the third branch comprises a second capacitor connected in series with a second, wherein said output is connected in parallel with said second capacitor; and
   a control unit configured for driving said first and said second electronic switch with the following time intervals which are repeated periodically:
   a) a first time interval, wherein said first switch is closed and said second switch is opened, so that a current flow from said supply signal through said primary winding of said transformer increases;
   b) a subsequent second time interval, wherein said first switch is opened and said second switch is opened;
   c) a subsequent third time interval, wherein said first switch is opened and said second switch is closed; and
   d) a subsequent fourth time interval, wherein said first switch is opened and said second switch is opened, so that the capacitance associated with said second switch is charged and the capacitance associated with said first switch is discharged,
   wherein said first and said second inductance are dimensioned such that said first and said second inductance provide during said fourth time interval a current which charges the capacitance associated with said second switch and discharges the capacitance associated with said first switch.
2. The electronic converter according to claim 1, wherein during said third time interval occurs an oscillation of a resonant circuit comprising said at least one capacitor connected between said second terminal of said first winding and said supply signal or said ground, said first capacitor connected in series with the secondary winding of said transformer and the leakage inductance of said transformer, wherein said at least one capacitor, said first capacitor and said leakage inductance are dimensioned such that:
   a) during said third time interval occur one or more half-periods of the oscillation of said resonant circuit, and
   b) the current which flows through the diode is zero at the end of said third time interval.
3. The electronic converter according to claim 2, wherein the capacitance of said at least one capacitor and the capacitance of said first capacitor are dimensioned such that:

$$C_R \leq \frac{Tr^2}{\pi^2 L_R}$$

where $C_R$ is the capacitance of said at least one capacitor connected in series with said first capacitor; Tr is the minimum duration of said third time interval, and $L_R$ is the leakage inductance of said transformer.
4. The electronic converter according to claim 1, wherein an equivalent capacitance at the intermediate point of said half-bridge which comprises said capacitances associated with said first and said second electronic switch is between 200 pF and 1.5 nF.
5. The electronic converter according to claim 1, wherein the sum of the durations of said first time interval, said second time interval, said third time interval and said fourth time interval is substantially constant.
6. The electronic converter according to claim 1, wherein the durations of said second time interval and the duration of said fourth time interval are substantially constant.
7. The electronic converter according to claim 1, wherein the values of said first and said second inductance are dimensioned as a function of:
   a) the voltage of said supply signal,
   b) the duration of said first time interval with respect to the duration of a switching period, c) the output current provided through said output, and
   d) an equivalent capacitance at the intermediate point of said half-bridge which comprises said capacitances associated with said first and said second electronic switch.
8. A method for operating an electronic converter, the method comprising
   providing a transformer with a primary winding and a secondary winding,
   wherein each winding comprises at least a first and a second terminal,
   selectively connecting said first terminal of said primary winding to a supply signal or a ground by a half-bridge comprising a first and a second electronic switch, wherein a respective capacitance and a respective diode are associated with said first and said second electronic switch,
   providing at least one capacitor connected between said second terminal of said primary winding and said supply signal or said ground,
   providing an electronic ZETA converter connected to said secondary winding, wherein said ZETA converter comprises three branches which are connected in parallel, wherein:
   a) the first branch comprises a first capacitor connected in series with the secondary winding of said transformer, so that said first branch comprises a first inductance which includes the magnetization inductance of said transformer, b) the second branch comprises a diode, and c) the third branch comprises a second capacitor connected in series with a second, wherein said output is connected in parallel with said second capacitor; and for driving said first and said second electronic switch by a control unit with the following time intervals which are repeated periodically:

a) a first time interval, wherein said first switch is closed and said second switch is opened, so that a current flow from said supply signal through said primary winding of said transformer increases;

b) a subsequent second time interval, wherein said first switch is opened and said second switch is opened;

c) a subsequent third time interval, wherein said first switch is opened and said second switch is closed; and d) a subsequent fourth time interval, wherein said first switch is opened and said second switch is opened, so that the capacitance associated with said second switch is charged and the capacitance associated with said first switch is discharged, wherein said first and said second inductance are dimensioned such that said first and said second inductance provide during said fourth time interval a current which charges the capacitance associated with said second switch and discharges the capacitance associated with said first switch.

9. A method for designing an electronic converter, the electronic converter comprising:

a transformer with a primary winding and a secondary winding, wherein each winding comprises at least a first and a second terminal, a half-bridge comprising a first and a second electronic switch for selectively connecting said first terminal of said primary winding to a supply signal or a ground, wherein a respective capacitance and a respective diode are associated with said first and said second electronic switch, at least one capacitor connected between said second terminal of said primary winding and said supply signal or said ground, an electronic ZETA converter connected to said secondary winding, wherein said ZETA converter comprises three branches which are connected in parallel, wherein:

a) the first branch comprises a first capacitor connected in series with the secondary winding of said transformer, so that said first branch comprises a first inductance which includes the magnetization inductance of said transformer, b) the second branch comprises a diode, and c) the third branch comprises a second capacitor connected in series with a second, wherein said output is connected in parallel with said second capacitor; and a control unit configured for driving said first and said second electronic switch with the following time intervals which are repeated periodically:

a) a first time interval, wherein said first switch is closed and said second switch is opened, so that a current flow from said supply signal through said primary winding of said transformer increases;

b) a subsequent second time interval, wherein said first switch is opened and said second switch is opened;

c) a subsequent third time interval, wherein said first switch is opened and said second switch is closed; and d) a subsequent fourth time interval, wherein said first switch is opened and said second switch is opened, so that the capacitance associated with said second switch is charged and the capacitance associated with said first switch is discharged, wherein said first and said second inductance are dimensioned such that said first and said second inductance provide during said fourth time interval a current which charges the capacitance associated with said second switch and discharges the capacitance associated with said first switch, the method comprising:

dimensioning said first and said second inductance such that said first and said second inductance provide during said fourth time interval a current which charges the capacitance associated with said second switch and discharges the capacitance associated with said first switch.

10. The method according to claim 9, wherein during said third time interval occurs an oscillation of a resonant circuit comprising said at least one capacitor connected between said second terminal of said first winding and said supply signal or said ground, said first capacitor connected in series with the secondary winding of said transformer and the leakage inductance of said transformer, and wherein the method comprises:

dimensioning said at least one capacitor, said first capacitor and said leakage inductance are dimensioned such that:

a) during said third time interval occur one or more half-periods of the oscillation of said resonant circuit, and b) the current which flows through the diode is zero at the end of said third time interval.

* * * * *

UNITED STATES PATENT AND TRADEMARK OFFICE
CERTIFICATE OF CORRECTION

PATENT NO. : 9,831,784 B2  Page 1 of 1
APPLICATION NO. : 15/024360
DATED : November 28, 2017
INVENTOR(S) : Daniele Luccato It is certified that error appears in the above-identified patent and that said Letters Patent is hereby corrected as shown below:

In the Claims

Column 17, Line 5 Claim 8: Please delete the word "for" between the word "and" and the word "driving"

Signed and Sealed this
Third Day of April, 2018

Andrei Iancu
*Director of the United States Patent and Trademark Office*